United States Patent [19]
Rajan et al.

[11] Patent Number: 5,897,738
[45] Date of Patent: Apr. 27, 1999

[54] PROCESS FOR MANUFACTURING A SIGN

[75] Inventors: Sundar J. Rajan, Woodbury; Joseph M. McGrath, Lake Elmo, both of Minn.

[73] Assignee: Minnesota Mining and Manufacturing Company, St. Paul, Minn.

[21] Appl. No.: 08/859,520

[22] Filed: May 20, 1997

Related U.S. Application Data

[63] Continuation of application No. 08/522,133, Aug. 31, 1995, abandoned.

[51] Int. Cl.$^6$ .................................................. B32B 31/00
[52] U.S. Cl. ........................ 156/283; 156/277; 156/320; 156/295; 156/291; 156/307.3; 264/119
[58] Field of Search .................................. 156/250, 277, 156/269, 283, 285, 291, 306, 307.3, 244.16, 295, 278, 320; 264/119

[56] References Cited

U.S. PATENT DOCUMENTS

| | | | |
|---|---|---|---|
| 3,679,612 | 7/1972 | Titow ........................................... 260/2 |
| 3,802,944 | 4/1974 | Tuug ........................................ 161/3.5 |
| 4,758,952 | 7/1988 | Harris, Jr. et al. . |
| 4,767,659 | 8/1988 | Bailey et al. ............................. 428/203 |
| 4,840,863 | 6/1989 | Otsu et al. ................................ 430/110 |
| 4,952,023 | 8/1990 | Bradshaw et al. ....................... 350/102 |
| 5,071,728 | 12/1991 | Watts ......................................... 630/126 |
| 5,085,918 | 2/1992 | Rajan et al. .............................. 428/195 |
| 5,227,194 | 7/1993 | De La Sierra E ....................... 427/162 |
| 5,378,575 | 1/1995 | Rajan et al. .............................. 430/126 |

FOREIGN PATENT DOCUMENTS

| | | |
|---|---|---|
| 0 309 588 A1 | 4/1989 | European Pat. Off. . |
| 0 424 131 A1 | 4/1991 | European Pat. Off. . |
| 0424131 | 4/1991 | European Pat. Off. . |
| 0 613 804 | 8/1994 | European Pat. Off. ........ B60R 13/10 |
| 41 26 530 A1 | 2/1993 | Germany . |
| 2 126 389 | 3/1984 | United Kingdom . |

OTHER PUBLICATIONS

Wicks, Zeno Jr. et al., *Organic Coatings, Science and Technology*, vol. 2, Ch. 31, 1994.
Bailey; "Powder Comes Full Cycle at Trek"; Industrial Paint & Powder Sep. 1996.
Triplett et al.; "Powder Coating Advances"; Industrial Paint & Powder; Dec. 1996.
Lovett; "Powder Coatings—An Industry Analysis"; Paint & Coatings Industry; Sep. 1996.
Trends—Powder, Coatings Market, Innovations Keep Expanding; Modern Paint and Coatings; May 1994.

*Primary Examiner*—Merrick Dixon
*Attorney, Agent, or Firm*—Robert H. Jordan; Peter L. Olson

[57] ABSTRACT

A process for preparing a sign that includes the steps of providing a sheet of material; defining on a surface of the sheet a series of image-bearig areas and non-image-bearing areas; treating the surface of the sheet with an essentially solvent-free composition comprising a colorant and a polymeric binder to selectively deposit the composition on the non-image-bearing areas of the surface of the sheet; and fusing the composition to create a continuous polymer film on the non-image-bearing areas.

20 Claims, No Drawings

PROCESS FOR MANUFACTURING A SIGN

This is a continuation of application Ser. No. 08/522,133 filed Aug. 31, 1995, now abandoned.

BACKGROUND OF THE INVENTION

This invention relates to manufacturing signs such as traffic signs and license plates.

Signs such as traffic signs and license plates feature a backing in which a series of images, e.g., alpha-numeric characters, symbols, artwork, and the like (the "image-bearing areas") is set against a background (the "non-image-bearing areas"). The characters may be clear, in which case the background is colored. Alternatively, the sign may consist of colored characters set against a clear background. The characters typically are formed using techniques such as embossing (in which the characters are defined mechanically) or printing (in which the characters are defined electronically or digitally).

Often the signs are provided with a retroreflective property to enhance visibility. This may take the form, e.g., of a retroreflective sheet placed over the image-bearing and non-image-bearing areas. Alternatively, the backing itself may be a retroreflective sheet. To protect the sign from, e.g. weathering and abrasion, a clear "top coat" may be included as well.

SUMMARY OF THE INVENTION

In a first aspect, the invention features a process for preparing a sign that includes the steps of: (a) providing a sheet of material; (b) defining on a surface of the sheet a series of image-bearing areas and non-image-bearing areas; (c) treating the surface of the sheet with an essentially solvent-free composition that includes a colorant and a polymeric binder to selectively deposit the composition on the non-image-bearing areas of the surface of said sheet; and (d) fusing the composition to create a continuous polymer film on the non-image-bearing areas.

As used throughout this application, "image-bearing area" refers to images such as alpha-numeric characters, symbols, artwork, and the like appearing on the surface of the sheet. "Non-image-bearing" area refers to any area of the sheet that lacks said images.

The essentially solvent-free composition preferably is in the form of a powder (i.e., discrete particles that fuse to form a continuous film upon heating).

In one preferred embodiment, the process includes providing a sheet of embossable material and embossing the sheet to define a series of image-bearing areas and non-image-bearing areas. In this embodiment, the image-bearing areas include one or more characters (e.g., alpha-numeric characters) raised relative to the non-image-bearing areas. The process may further include the step of providing a sheet of retroreflective material over the image-bearing areas and the non-image-bearing areas.

In another preferred embodiment, the process includes providing a sheet of retroreflective material and printing on a surface of the sheet to define a series of image-bearing areas and non-image-bearing areas.

To selectively deposit the composition on the non-image-bearing areas of the surface of said sheet, both the non-image-bearing areas and at least a portion of the image-bearing areas are preferably treated with the composition, after which the composition is removed from the image-bearing areas.

The sign may also be provided, if desired, with a light transmitting, protective top layer over the image-bearing areas and non-image-bearing areas. Preferably, this layer is formed by overlaying the image-bearing areas and the non-image-bearing areas with an essentially solvent-free, light transmitting composition that includes a polymeric binder, and fusing the binder to form the top layer.

Examples of suitable materials for the polymeric binder includes $C_1$–$C_9$ alkyl acrylate or methacrylate polymers, polyvinyl acetals, ionomeric polymers and copolymers, polyesters, polyurethanes, polyureas, and vinyl resins. These materials may be used alone or in combination with each other (or with other materials). The composition may also include a charge carrier to facilitate certain coating processes.

In a second aspect, the invention features a process for preparing a sign that includes the steps of: (a) providing a sheet of material; (b) defining on a surface of the sheet a series of image-bearing areas and non-image-bearing areas; (c) overlaying the image-bearing areas and non-image-bearing areas with an essentially solvent-free, light transmitting composition that includes a polymeric binder; and (d) fusing the binder to form a light transmitting, protective top layer over the image-bearing areas and non-image-bearing areas.

The invention provides a simple, economical process for manufacturing signs such as traffic signs and license plates. Because the process is essentially solvent-free, it eliminates solvent vapors encountered during manufacture (and the health and environmental problems associated with such vapors). Moreover, the solvent-free nature of the process makes it suitable for applying a variety of polymeric materials.

Other features and advantages of the invention will be apparent from the following description of illustrative embodiments thereof, and from the claims.

DESCRIPTION OF ILLUSTRATIVE EMBODIMENTS

Materials

Compositions useful for both the background area (i.e., the non-image-bearing areas) and the top coat are essentially solvent-free and, upon cure, weather- and abrasion-resistant. Moreover, such compositions preferably exhibit good adhesion to the substrate to which they are applied. In the case of compositions for coating the background area, the composition includes one or more polymer binders and a colorant. In the case of top coats, however, the colorant is omitted in order to provide a clear coating. If the composition is to be applied by electrostatic means, a charge carrier may be included as well.

The polymer binder may be either a thermoplastic or a thermosetting material. Examples of suitable polymer binders include alkyl-substituted acrylate and methacrylate polymers, and mixtures thereof, in which the alkyl group contains between one and nine carbon atoms, inclusive. Specific examples include copolymers of methyl and butyl methacrylates commercially available from Rohm and Haas Co. of Philadelphia, Pa. under the designation "Acryloid B-66." Also suitable are polyvinyl acetals (e.g., polyvinyl butyrals commercially available from Monsanto Chemical Co. of St. Louis, Mo. under the designation "BUTVAR" brand polyvinyl butyrals B-90 and B-72); polyesters (e.g., "VITEL" brand PE-200D commercially available from the Goodyear Tire and Rubber Company or "ARAKOTE 3000" brand carboxyl-terminated polyester, alone or in combination with "ARALDITE PT8101" brand polyfunctional epoxy resin, both of which are commercially available from Ciba Geigy Chemical Company of Hawthorne, N.J.); vinyl resins (e.g., "VINYLITE VAGH" brand vinyl resin, a copolymer of vinyl chloride and vinyl acetate commercially available from Union Carbide Company of Danbury, Conn.), and ionomeric polymers and copolymers (e.g., copolymers of ethylene or propylene with acrylic acid, methacrylic acid, or vinyl acetate).

The charge carriers are preferably relatively light transmissive or transparent, and resistant to ultraviolet degradation. Suitable carriers may be either positively or negatively charged. Examples of negatively charged materials include those commercially available from Fujikura Kasei of Japan under the trade designations "FCA1001NB" and "FCA1001NZ." Examples of positively charged materials include polymers such as polyalkyl acrylates and methacrylates, polyesters, and vinyl resins having amino or ammonium functional groups. One preferred charge carrier is a copolymer of butyl and methyl methacrylate (e.g., TRIBLOX PC-100 brand acrylic polymer available from E. I. DuPont de Nemours & Co. of Wilmington, Del. having the following characteristics: molecular weight of 2000 to 5000; glass transition temperature of 53° C. to 59° C. (onset at about 46° C.), and a nitrogen content of about 1% (as measured by NMR)).

Suitable colorants include both pigments and dyes Generally, the colorants should be resistant to environmentally induced chemical degradation and ultraviolet degradation.

Examples of suitable pigments include Pigment Red 179 or 224 commercially available from the Bayer Company of Rockhill, S.C.; Pigment Yellow 110 or Pigment Violet 37 available from the Ciba-Geigy Company of Hawthorne, N.J.; Pigment Green 7 or 36 available from the Sun Chemical Company of Cincinnati, Ohio; Pigment Blue 15;1 or Blue 15;6 commercially available from BASF Corp. of Wyandotte, Mich.; and Regal 500R carbon black commercially available form the Cabot Corporation of Boston, Mass. The pigments are preferably dispersed in a dispersing resin to maintain the small pigment particle size desired for obtaining a light transmitting coating. Examples of suitable dyes include Amaplast Yellow commercially available from Color-Chem International Corporation of Glen Rock, N.J. and LATYL Brilliant Blue BGA commercially available from E.I. DuPont de Nemours & Co. of Wilmington, Del.

Suitable dry compositions may be prepared by combining from about 64% to about 98% by weight (preferably about 76% to about 92% by weight) binder with 0% to about 20% by weight (preferably about 0% to about 12% by weight) charge carrier, and about 1% to about 16% by weight (preferably about 4% to about 8% by weight) colorant.

The binder, charger carrier (if present), and colorant may be mechanically mixed using a twin screw extruder (e.g., a variable speed twin screw extruder such as a Baker Perkins gear drive model having a Haake rheocord torque rheometer). Preferably, the extruder generates a temperature of approximately 150° C. to approximately 225° C. during extrusion. The extruded product may be hammer milled and then jet milled to generate a mixture having particle sizes ranging from about 5 to about 200 micrometers, preferably from about 5 to about 50 micrometers, and more preferably from about 5 to about 20 micrometers. A suitable jet mill is an NPK Supersonic Jetmill model PJM IDS-2 available from Nippon Pneumatic Manufacturing Company of Japan. The resulting material may be added to the toner hopper of a powder coating application system, e.g., a Tribomatic II Powder Coating System available from Nordson Co. of Amherst, Ohio, and then applied to the desired surface. Alternatively, the material may be added to the toner hopper of a laser printer, e.g., Multifunction Printer Model 1800 or Model 679 LBQ Laser Printer (both of which are available from Minnesota Mining and Manufacturing Co. of St. Paul, Minn.).

Suitable surfaces to which the essentially solvent-free compositions may be applied include both embossed and unembossed sheets. Embossed sheets (which are particularly useful in the case of license plate manufacture) typically feature a thin piece of embossable material overlaid with retro-reflective sheeting. The preferred embossable material is an aluminum sheet having a thickness on the order of about 0.8 mm. Examples of suitable retro-reflective sheeting are well-known, and include 3M™ SCOTCH-LITE™ REFLECTIVE SHEETING, HIGH INTENSITY GRADE and 3M™ SCOTCH-LITE™ REFLECTIVE LICENSE PLATE SHEETING, both of which are available from Minnesota Mining and Manufacturing Co. of St. Paul, Minn. The surface layers of such sheeting may be made of polyalkylacrylates or polyalkylmethacrylates (e.g., polymethyl methacrylate), polyesters, vinyl polymers, or polyvinyl acetals (e.g., polyvinyl butyral).

Other examples of surfaces to which the coating compositions may be applied include sheets made, e.g., from polyalkylacrylates, polyalkylmethacrylates, polyesters, vinyl polymers, polyurethanes, cellulose esters, fluoropolymers, polycarbonates, polyolefins, ionomeric copolymers, and copolymers of ethylene or propylene with acrylic acid, methacrylic acid, or vinyl acetate, as well as combinations of these materials with each other or with other polymers.

Sign Preparation

In one embodiment (useful, e.g., in the manufacture of license plates), a thin sheet of embossable material (e.g., aluminum) having a facing layer of retroreflective sheeting is embossed in an embossing unit of conventional design as described, e.g., in Rajan et al., U.S. Pat. No. 5,085,918 (hereby incorporated by reference) to form a series of raised characters against a relatively flat background. The raised characters form at least one image-bearing portion of the surface; the surface may contain additional image-bearing areas in the form of, e.g., printed artwork. Next, the entire surface (which optionally may be heated to facilitate powder deposition), with the exception of any areas bearing printed artwork, is covered with a layer of the dry coating composition described above; at this stage, both embossed and unembossed areas are covered with powder. The powder is then selectively removed from the embossed areas using, e.g., adhesive-coated paper or ULTRA-WIPE™ 532B wiping fabric from Minnesota Mining & Manufacturing Co. of St. Paul, Minn., after which the powder remaining in the unembossed (background) areas is fused to form a continuous coating. The fusing step may be accomplished by means of, e.g., infrared heating or other suitable means of supplying an amount of heat sufficient to cause the polymer binder in the powder to flow. Following fusion, the product can be cut into its final shape.

If desired, instead of covering the entire surface with the coating composition, followed by selective removal to leave powder only in the non-image-bearing areas, the composition could be deposited initially only in the non-image-bearing areas.

To protect the sign from weathering, a clear top coat may be applied over the sheeting following the fusing step. The top coat may be applied using conventional techniques as described in the aforementioned Rajan et al. patent. For example, the top coat may be applied by dip coating the sheeting in a solution of polymer binder. Alternatively, the top coat may be applied in the form of a sheet by laminating the sheet to the surface of the sheeting. Preferably, however, the top coat is applied by depositing the top coat in the form of an essentially solvent-free powder to the surface of the sheeting, followed by heating to fuse the powder particles into the form of a continuous film. It is also possible to apply the top coat to the unfused, powder-coated, image-bearing surface and then to fuse both layers in a single operation.

In a second embodiment, the image-bearing areas are formed not by embossing, but by printing an electronically or digitally generated image onto the surface of the sheet using, e.g., a laser printer as described in the aforementioned Rajan patent. In this embodiment, the sheet need not contain a layer of embossable material. Deposition of the powder coating is as described above in the case of embossable sheets.

The invention will now be described further by way of the following examples. All amounts are given in weight percent unless otherwise noted.

EXAMPLES

Example 1

A mixture was prepared by combining 78.7% Acryloid B-66 binder resin, 8% TRIBLOX PC100 charge carrier, 13% pigment (K6911D from BASF Corporation), 0.2% pigment (Pro Jet 900 NP from ICI Colors Company), and 0.1% flow additive (Cab-O-Sil TS530 from Cabot Corporation). The components were mixed in a Baker Perkins gear drive variable speed twin screw extruder equipped with a Haake rheocord torque rheometer and extruded as a mixture at a temperature range between 150° C. to 225° C. The extruded mixture was hammer milled, and then jet milled in an NPK Supersonic Jetmill model PJM IDS-2. The jet milled sample was then classified to collect material having a particle size range from 5 to 30 micrometers.

The classified material (in the form of a dry powder) was mixed with 0.25% of flow additive (Cab-O-Sil TS530 from Cabot Corporation) and placed in the powder feed hopper of a Nordson brand Tribomatic II Powder Coating System. An embossed aluminum license plate blank whose surface was overlaid with a layer of 3M™ SCOTCH-LITE™ REFLECTIVE LICENSE PLATE SHEETING was sprayed with the dry powder until the entire surface of the plate blank was fully covered with the powder. The raised (i.e., embossed) areas of the plate covered with the powder were then contacted with adhesive-coated paper (Application Tape SCPM 3 available from Minnesota Mining and Manufacturing Co.) to remove powder from the raised areas, leaving behind powder covering all the flat (i.e., unembossed) areas. Next, powder was melted and fused by placing the sample in an oven at 300° F. for 10 minutes to form a continuous polymeric coating in the flat areas. The coating adhered well to the surface of the sheeting Example 2

The procedure of Example 1 was followed except that the coating composition did not contain pigment. In addition, powder was not removed from the raised areas of the sheeting, yielding a transparent coating covering the entire surface of the sheeting. The coating adhered well to the surface of the sheeting.

Example 3

The procedure of Example 2 was followed except that the coating composition did not contain a charge carrier. The resulting coating adhered well to the surface of the sheeting.

Other embodiments are described within the following claims.

Various modifications and alterations of this invention will become apparent to those skilled in the art without departing from the scope and spirit of this invention.

What is claimed is:

1. A method of preparing a sign component comprising the steps of:
   a) providing a sheet of polymeric material;
   b) applying a powder layer over a major surface of the sheet; and
   c) using the powder layer to provide a light-transmissive protective layer.

2. The method of claim 1, wherein the powder is fused by the application of heat.

3. The method of claim 1, wherein the powder is used by the application of heat and pressure.

4. The method of claim 1, wherein the powder is fused by curing.

5. The method of claim 1, wherein the process further includes the step of defining a series of images on a major surface of the sheet.

6. The method of claim 1, wherein steps b) and c) are completed essentially without releasing solvents.

7. The method of claim 1, wherein the protective layer is the outermost layer of the sign component.

8. The method of claim 1, wherein the powder layer comprises a polymeric binder.

9. The method of claim 1, wherein the polymeric binder comprises a material selected from the group consisting of $C_1$–$C_9$ alkyl acrylate or methacrylate polymer, a polyvinyl acetal, an ionomeric polymer of copolymer, a polyester, a polyurethane, a polyurea, a vinyl resin, and combinations thereof.

10. The method of claim 1, wherein the powder layer comprises a charge carrier.

11. The method of claim 1, wherein step a) comprises the step of providing a sheet of retroreflective material.

12. The method of claim 1, wherein the method further comprises the step of d) applying the sign component to a substrate.

13. A method of preparing a sign component, comprising the steps of:
   a) providing an embossed sign component including a sheet of polymeric material having a major surface, the raised embossed portions defining non-image bearing areas;
   b) applying a powder comprising a colorant and a polymeric binder to substantially all of the major surface of the sheet;
   c) removing the powder from the non-image bearing areas; and
   d) using the applied powder to provide an image.

14. The method of claim 13, wherein the sheet is a retroreflective sheet, and the sign component comprises the retroreflective sheet bonded to a metal substrate.

15. The method of claim 13, wherein step b) comprises applying the powder to the entire major surface of the sheet, and then removing the powder from the non-image bearing areas.

16. The method of claim 13, wherein the method further comprises the steps of:

e) applying a powder layer over a major surface of the sheet; and f) fusing the powder layer to provide a light-transmissive protective layer.

17. The method of claim 13, wherein the polymeric binder comprises a material selected from the group consisting of $C_1$–$C_9$ alkyl acrylate or methacrylate polymer, a polyvinyl acetal, an ionomeric polymer of copolymer, a polyester, a polyurethane, a polyurea, a vinyl resin, and combinations thereof.

18. The method of claim 13, wherein the powder further comprises a charge carrier.

19. The method of claim 13, wherein the method is completed essentially without releasing solvents.

20. The method of claim 16, wherein the powder layer is used by at least one of heat, pressure, and curing.

* * * * *

UNITED STATES PATENT AND TRADEMARK OFFICE
CERTIFICATE OF CORRECTION

PATENT NO.   : 5,897,738
DATED        : April 27, 1999
INVENTOR(S)  : Rajan, Sundar J.

It is certified that error appears in the above-identified patent and that said Letters Patent is hereby corrected as shown below:

Column 6,
Lines 18 and 60, delete "using" and insert in place therefor -- fusing --.
Line 22, delete "used" and insert in place thereof -- fused --.
Line 35, delete "1" and insert in place thereof -- 8 --.

Column 8,
Line 9, delete "used" and insert in place thereof -- fused --.

Signed and Sealed this

Fourth Day of November, 2003

JAMES E. ROGAN
*Director of the United States Patent and Trademark Office*